United States Patent
Waaben

[11] 4,056,719
[45] Nov. 1, 1977

[54] TWO-WAY TELEPHONE TRANSMISSION SYSTEM UTILIZING OPTO-COUPLERS

[75] Inventor: Sigurd Gunther Waaben, Princeton, N.J.

[73] Assignee: Bell Telephone Laboratories, Incorporated, Murray Hill, N.J.

[21] Appl. No.: 710,562

[22] Filed: Aug. 2, 1976

Related U.S. Application Data

[63] Continuation-in-part of Ser. No. 548,404, Feb. 10, 1975, abandoned.

[51] Int. Cl.² .................. G01J 1/32; H03F 17/00; H04B 9/00
[52] U.S. Cl. .................. 250/199; 250/205; 250/551; 250/578; 307/311; 330/59
[58] Field of Search .............. 250/199, 205, 551, 578; 330/59; 307/311; 328/2

[56] References Cited

U.S. PATENT DOCUMENTS

| | | | |
|---|---|---|---|
| 3,215,843 | 11/1965 | Neil | 250/205 |
| 3,327,239 | 6/1967 | Carpenter | 330/59 |
| 3,423,579 | 1/1969 | Del Luca | 235/194 |
| 3,497,717 | 2/1970 | Barber | 307/229 |
| 3,500,236 | 3/1970 | Clark | 331/94.5 |
| 3,770,966 | 11/1973 | Sagawa | 250/205 |
| 3,772,514 | 11/1973 | Sunderland | 250/217 S |
| 3,811,094 | 5/1974 | Lee | 330/59 |
| 3,893,037 | 9/1973 | Herbert | 330/59 |

OTHER PUBLICATIONS

Harris, S. "Linear Photodiode Opto-Isolator Circuits" Oct. 1972, Monsanto Commercial Products Co. AN505.
Graeme, Gerald G., *OPERATIONAL AMPLIFIERS*, 1973, pp. 63-69, "Feedback Linearized Configurations."
Burr-Brown Update, vol. II, No. 2, June 1976, "Breakthrough in Optical Coupling."

*Primary Examiner*—Howard W. Britton
*Attorney, Agent, or Firm*—Irwin Ostroff

[57] ABSTRACT

A two-way transmission system, which utilizes solid state circuitry and a pair of opto-couplers, achieves high linearity and provides high electrical isolation between input and output signals without the use of the traditional hybrid transformer. Each opto-coupler includes a single light emitting diode (LED), two light detecting diodes (LDDs), and an amplifier. The LED is connected to the output of the amplifier and is physically located with respect to the two LDDs such that light emitted by the LED impinges on the photosensitive areas of the LDDs. The first LDD is coupled to the input of the amplifier, and the second LDD is coupled to output circuitry. This opto-coupler is relatively temperature insensitive and compensates for the inherent nonlinearity of the LED. These characteristics facilitate the use of the opto-coupler in systems which require relatively high linearity and temperature stability.

11 Claims, 8 Drawing Figures

TWO-WAY TELEPHONE TRANSMISSION SYSTEM UTILIZING OPTO-COUPLERS

CROSS REFERENCE TO RELATED APPLICATION

This application is a continuation-in-part of my co-pending application Ser. No. 548,404 filed Feb. 10, 1975, now abandoned.

BACKGROUND OF THE INVENTION

This invention relates to linear communications systems which use optical coupler circuitry and, in particular, to optically coupled circuitry which has sufficient linearity and temperature insensitivity to be used in a telephone system.

Various attempts have been made to eliminate transformers with the use of solid-state electronics. One solid-state combination suggested is the light emitting diode (LED) - light detecting diode (LDD) pair. One serious disadvantage of an LED-LDD pair optical coupler is the inherent non-linear transfer characteristics and the poor temperature sensitivity. Various attempts have been made to compensate for these undesirable characteristics of the LED-LEDD pair to allow the use thereof in analog systems which require a relatively high degree of linearity (low distortion) and long term stability.

One such attempted solution is the use of two substantially identical serially connected LEDs connected to the output of an amplifier. Two LDDs are physically located with respect to the LEDs such that light from the first LED impinges on the first LDD, and light from the second LED impinges on the second LDD. The first LDD is coupled to the input of the operational amplifier so as to create a negative feedback path. The second LDD is coupled to output circuitry. The negative feedback path serves to help linearize the output signal with respect to an input signal. One serious problem associated with this configuration is that the two serially connected LEDs must have essentially identical electro-optical characteristics in order to obtain reasonably good linearity. The requirement of matching the characteristics of two LEDs closely makes such an optical coupler economically unattractive.

One solution to the above problem of matching diodes is the use of two parallel LEDs with separate series resistors coupled to each. The LEDs are matched electrically and optically as closely as possible. Differences in the electrical and optical characteristics can be somewhat attenuated at any one operating point by varying one or the other of the resistors to vary the current through either LED. A major disadvantage of this configuration is that while one setting of resistor values may produce a high-quality linear response at one operating point, the same resistor values will result in unsatisfactory response at other operating points.

It would be desirable to have a solid-state optical coupler which does not require very close matching of the electro-optical characteristics of components but does provide relatively high linearity and is relatively insensitive to temperature variations.

SUMMARY OF THE INVENTION

One embodiment of the invention is an optically coupled two-wire to two-wire bilateral communication system which comprises essentially two amplifiers (1 and 2), two line termination impedances, two cancellation (hybrid subtraction) impedances, and two opto-couplers which each comprise a dual input amplifier, a light emitting diode (LED) and two light detecting diodes (photo-diodes) (LDDs).

In each opto-coupler the LED and one LDD are coupled to the output and first input, respectively, of the amplifier associated with that opto-coupler. The second LDD of each opto-coupler is coupled to an input of one of amplifiers 1 or 2. The first LED of each opto-coupler is positioned with respect to the first and second LDDs such that light emitted by the first LED impinges on the photosensitive areas of the first and second LDDs and gives rise to a feedback current signal which is coupled to the input of the amplifier of the opto-coupler.

In the communication system, a first input/output terminal is coupled through a first summing impedance to the first input terminal of the amplifier of the first optocoupler. The output of amplifier 1 is coupled through the first line termination impedance to the first input/output terminal and to the second input of the amplifier associated with the first opto-coupler through a first cancellation (hybrid-subtraction) impedance.

A second input/output terminal is coupled through a second summing impedance to the first input of the amplifier of the second opto-coupler. The output of amplifier 2 is coupled to the second input/output terminal through a second line termination impedance and to the second input of the amplifier of the second opto-coupler through the second cancellation (hybrid subtraction) impedance.

Each opto-coupler employs negative feedback which modulates the output signal of the amplifier in such a manner that the output signal current induced in the second LDD is essentially linearized with respect to an input signal applied to the first input of the amplifier associated with the opto-coupler. The opto-couplers, in addition to providing linear output signals, provide relatively high electrical isolation between the two input/output terminals.

The amplifiers (1 and 2) provide gain such that a signal appearing at either input/output terminal is amplified at the other input/output terminal. The abovedescribed communication system provides gain, and relatively high electrical isolation and linearity. This is all achieved without the use of the traditional hybrid transformer and without the necessity of closely matching diode characteristics.

Another embodiment of the invention is an optically coupled bidirectional communication system which comprises two amplifiers (1 and 2), at least one cancellation impedance, and one summing impedance, and two opto-couplers which each comprise a single input Darlington amplifier, a light emitting diode and two light detecting diodes. A first input/output terminal is coupled through a first summing impedance to the input of one of the two single input Darlington amplifiers and to the output of one of amplifiers (1 and 2). One cancellation impedance is coupled to the Darlington amplifier and to the other amplifier associated with the first input/output terminal.

These and other features of the invention will be better understood from a consideration of the following detailed description taken in conjunction with the following drawins:

DETAILED DESCRIPTION

Figure 1:
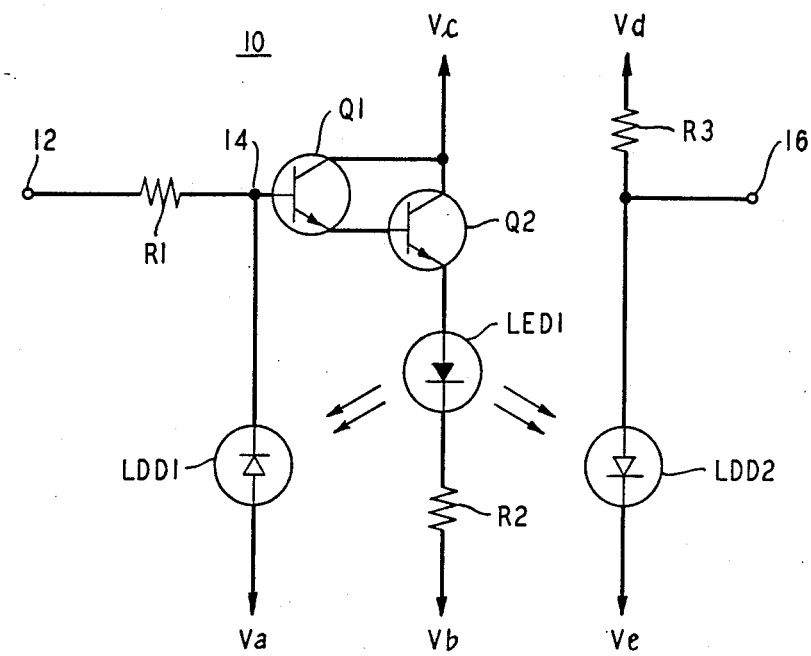
FIG. 1 illustrates an embodiment of an opto-coupler circuit.

Now referring to FIG. 1, there is illustrated an optical coupler 10 which comprises a Darlington pair of n-p-n transistors Q1 and Q2, a light emitting diode LED1, and light detecting diodes LDD1 and LDD2. An input terminal 12 is connected to one terminal of a resistor R1. The other terminal of R1 (14) is connected to the base of Q1 and the cathode of LDD1. The anode of LDD1 is coupled to a source of potential Va. The emitter of Q2 is connected to the anode of LED1.

The cathode of LED1 is connected through a resistor R2 to a source of potential Vb. The collectors of Q1 and Q2 are connected together to a source of potential Vc. The potential Va is selected such that LDD1 is reverse-biased during the normal operation of circuit 10. The potentials of Vc and Vb are selected such that LED1 is forward-biased and current flow can occur through the series combination of LED1 and R2. The anode of LDD2 is coupled to a terminal 16 (the output terminal) and through a resistor R3 to a source of potential Vd. The cathode of LDD2 is coupled to a source of potential Ve. Potentials Vd and Ve are selected such that LDD2 is normally operating in reverse bias.

LED1 is positioned with respect to LDD1 and LDD2 such that light emitted by LED1 impinges on the photosensitive areas of LDD1 and LDD2.

An input signal applied to terminal 12 is amplified by Q1 and Q2 and gives rise to a current through Q2, LED1 and R2. The current flow through LED1 causes LED1 to emit light that impinges on the light sensitive areas of LDD1 and LDD2. The current flow through LDD1 acts as negative feedback to the input of the Darlington pair Q1 and Q2. This feedback modifies the output signal at the emitter of Q2 and causes the current level through Q2 and LED1 to vary in response thereto. Accordingly, by appropriate chance of operating conditions the light output of LED1 is varied such that the photoinduced current flow through LDD2 is linearized with respect to the input signal applied to terminal 12.

Photoinduced current in LDD2 flows through R3 and thus gives rise to an output voltage signal at terminal 16 which is linearized with respect to the input signal voltage applied to terminal 12.

The relationship between incident light impinging on a light detecting diode (photodiode) and the resulting conduction therethrough is known to be a very linear one. This characteristic of photodiodes makes it necessary that LDD1 and LDD2 be closely identical. This feature allows circuit 10 to be manufactured with reasonable economy.

In one possible operating condition LDD1 and LDD2 are arranged to receive substantially equal amounts of light signal energy from LED1. The feedback to the input of the Darlington pair is a function of the light received by LDD1. As the amount of light received by LDD1 decreases, the feedback decreases. Correspondingly, distortion caused by the nonlinearity of LED1 is cancelled to a lesser extent. This results in somewhat less linearization (more distortion) between output and input signals. If the amount of light incident of LDD1 increases, the negative feedback signal amplitude increases and the linearization improves (distortion decreases). Considerable design flexibility is available such that the amount of feedback can be varied over wide limits.

Figure 2:
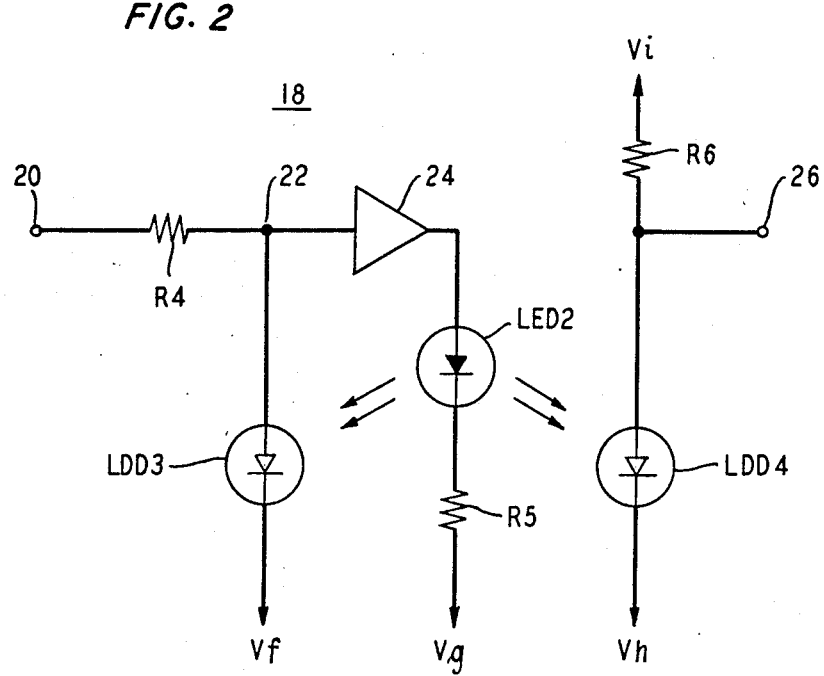
FIG. 2 illustrates an embodiment of another optocoupler circuit.

Now referring to FIG. 2 there is illustrated an alternative form of optical coupler 18 which comprises an operational amplifier 24, a light emitting diode LED2, and light detecting diodes LDD3 and LDD4. An input terminal 20 is connected through a resistor R4 to the anode of LDD3 and inverting input terminal 22 of operational amplifier 24. The output of amplifier 24 is connected to the anode of LED2. The cathode of LED2 is coupled through a resistor R5 to a source of potential Vg. The cathode LDD3 and LDD4 are coupled to sources of potentials Vf and Vh, respectively. The anode LDD4 is connected to output terminal 26 and to potential Vi through a resistor R6.

LED2 is positioned with respect to LDD3 and LDD4 such that light emitted by LED2 impinges on the photosensitive areas of LDD3 and LDD4. Potentials Vf, Vh and Vi are selected such that LDD3 and LDD4 normally operate in a reverse-bias condition. The potential of Vg is selected such that LED2 is able to operate in a forward-bias condition.

An input signal applied to terminal 20 is amplified by 24 and gives rise to a current through LED2. The current flow through LED2 causes LED2 to emit light that impinges on the light-sensitive areas of LDD3 and LDD4. This causes photoinduced current to flow in LDD3 and LDD4. The current flow through LDD3 acts as negative feedback to input terminal 22 of 24. This feedback modifies the output signal of 24 and causes the current level through LED2 to vary in response thereto. Accordingly, the light output of LED2 is varied such that the photoinduced current which flows through LDD4 is linearized with respect to the input signal applied to input terminal 20.

Photoinduced current in LDD4 flows through R6 and thus gives rise to an output voltage signal at terminal 26 which is linearized with respect to the input signal voltage applied to terminal 12.

As previously mentioned, the relationship between incident light impinging on a light detecting diode (photodiode) and the resulting conduction therethrough is known to be a very linear one and this characteristic of photodiodes makes it unnecessary that LDD3 and LDD4 be closely identical.

In one operating condition, LDD3 and LDD4 receive substantially equal amounts of light signal energy from LED2. The feedback to the input of 24 is a function of the light received by LDD3. As the amount of light received by LDD3 decreases, the feedback decreases. Correspondingly, distortion caused by the non-linearity of LED2 is cancelled to a lesser extent. This results in somewhat less linearization (more distortion)

between output and input signals. If the amount of light incident on LDD3 increases, the negative feedback signal amplitude increases and the system linearization improves (distortion decreases). Considerable design flexibility is available such that the amount of feedback can be varied over wide limits.

The input signal applied to terminal 20 can be dc or ac. The corresponding output signal at terminal 26 is correspondingly dc or ac.

Figure 3:
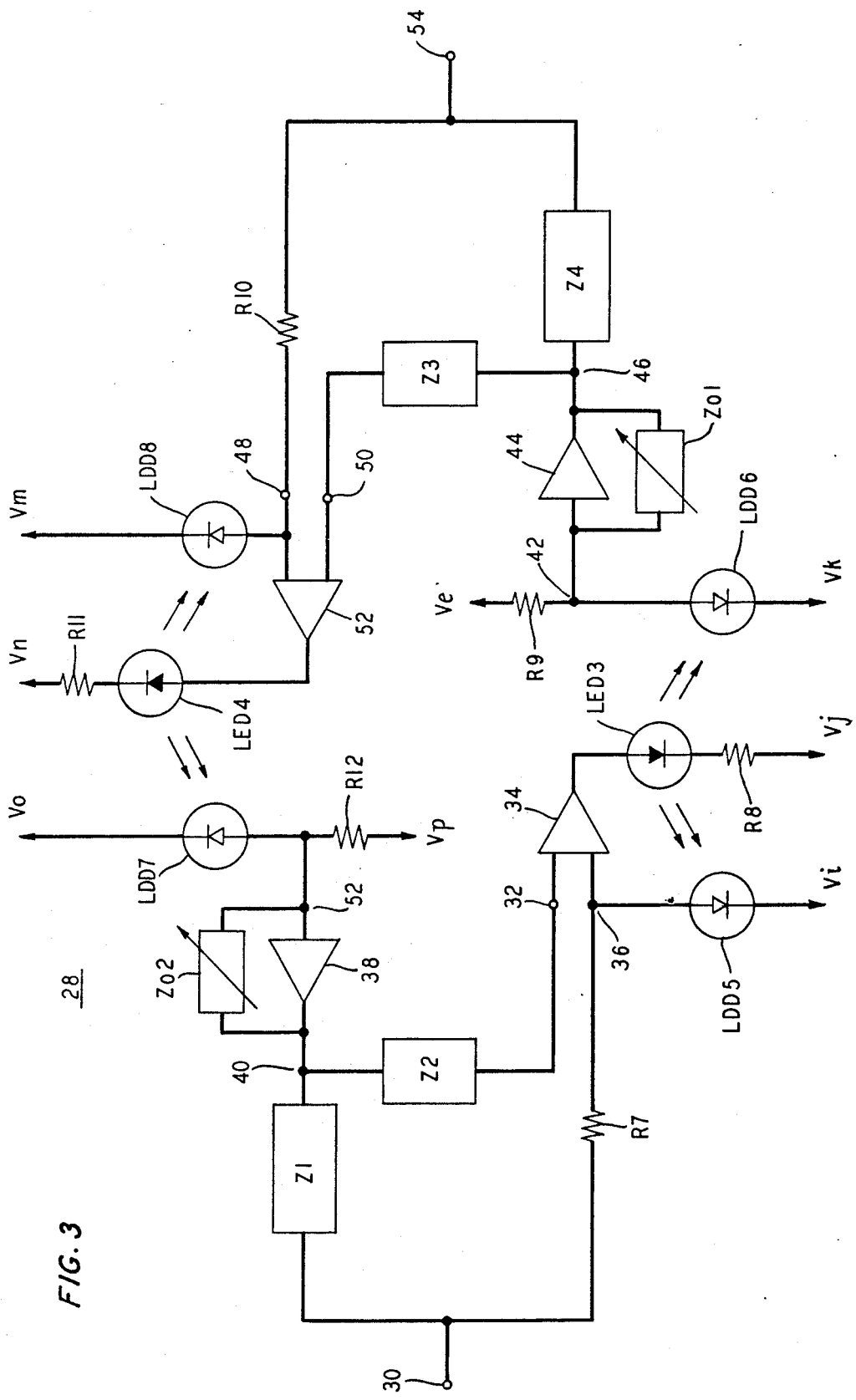
FIG. 3 illustrates an optically coupled bilateral communication system.

Now referring to FIG. 3 there is illustrated an optically coupled bidirectional communication system 28 which comprises two light emitting diodes LED3 and LED4, four light detecting diodes (photodiodes) LDD5, LDD6, LDD7 and LDD8, two dual input differential operational amplifiers 34 and 52, and two single input operational amplifiers 38 and 44. A first input/output terminal 30 is connected through a line-terminating impedance Z1 to terminal 40 (the output of amplifier 38) and to input terminal 36 of amplifier 34 through a summing resistor R7. A cancellation (hybrid subtraction) impedance Z2 is connected between terminal 40 and input terminal 32 of amplifier 34. LDD5 is coupled by the anode to terminal 36 and by the cathode to potential Vi. The output of amplifier 34 is coupled to the anode LED3. The cathode of LED3 is coupled through a resistor R8 to potential Vj.

LDD6 is coupled by the anode to input terminal 42 of amplifier 44 and to a resistor R9. R9 is coupled to potential Ve. The cathode of LDD6 is coupled to potential Vk. Output terminal 46 of amplifier 44 is connected to input/output termnal 54 through line termination impedance Z4 and to input terminal 50 of amplifier 52 through cancellation (hybrid subtraction) impedance Z3. Terminal 54 is coupled to input terminal 48 of amplifier 52 and the anode of LDD8 through summing resistor R10. The cathode of LDD8 is coupled to potential Vm. The output of amplifier 52 is connected to the anode of LED4. The cathode of LED4 is coupled to potential Vn through resistor R11.

Again control feedback impedance Zol is connected across terminals 42 and 46 of amplifier 44 and a gain control feedback impedance Zo2 is connected across terminals 52 and 40 of amplifier 38. The anode of LDD7 is connected to input terminal 52 of amplifier 38 and a resistor R12. The cathode of LDD7 is coupled to a potential Vo and R12 is coupled to a potential Vp.

LED3 is positioned with respect to LDD5 and LDD6 such that light emitted by LED3 impinges on the photosensitive areas of LDD5 and LDD6. LED4 is positioned with respect to LDD7 and LDD8 such that light emitted by LED4 impinges on the photosensitive areas of LDD7 and LDD8.

An input signal applied to terminal 30 can propagate through two input paths. The first path is through Z1 to terminal 40 (the output terminal of amplifier 38). The input signal cannot propagate past terminal 40 since the output of operational amplifier 38 acts as a virtual ground. The second path is through R7 to terminal 36. The optocoupler made up of R7, amplifier 34, LED3, LDD5 and LDD6 acts in substantially the same manner as the opto coupler made up of R4, amplifier 24, LED2, LDD3 and LDD4 of FIG. 2. Thus an input signal applied to the input terminal 30 is optically coupled to terminal 42 and the inherent nonlinearity of LED3 is effectively cancelled because of the optical feedback to LDD5.

The signal at terminal 42 is amplified by amplifier 44 and is coupled from terminal 46 to the input/output terminal 54 through impedance Z4 and then to input terminal 48 through R10. In addition, the signal at terminal 46 is coupled to the input termnal 50 through Z3. Input/output terminal 54 has coupled thereto sender/receiver circuitry (not illustrated) which has an inherent impedance associated therewith. Z3 and Z4 are designed, taking into account the impedance characteristics of the sender/receiver circuitry (not illustrated) couple to terminal 54, such that substantially equal signals are coupled to input terminals 48 and 50 of amplifier 52 from output terminal 46 of amplifier 44.

Equal signals appearing at the two input terminals (48 and 50) of differential amplifier 52 results in no output signal. Consequently the current level in LED4 does not change. Therefore, the input signal from terminal 30 is not coupled back through LDD7, amplifier 38 and Z1 to input/output terminal 30.

Thus, an input signal applied to terminal 30 is transmitted to terminal 54. It is effectively cancelled before the signal can propagate back to terminal 30 from where it originated.

An input signal applied to input/output terminal 54 propagates through two input paths. The first path is through Z4 to terminal 46. The second path is through R10 to an input terminal 48 of amplifier 52. The output terminal 46 of operational amplifier 44 acts as a virtual ground and thus prevents the signal from propagating further.

The input signal at 48 causes an output signal to appear at the output of 52 which causes LED4 to emit light in response thereto. This results in a signal being induced in LDD7 and LDD8. The light signal to LDD8 is a feedback signal and the light signal to LDD7 is the output signal. The output of amplifier 38 is coupled through Z1 to input/output terminal 30 which is coupled through R7 to the input terminal 36 of amplifier 34. The output signal at terminal 40 is also coupled through Z2 to input terminal 32 of amplifier 34. The sender/receiver circuitry (not illustrated) coupled to terminal 30 has an inherent impedance characteristics associated therewith. Z1 and Z2 are designed, taking into account the impedance characteristics of the sender/receiver connected to terminal 30, to insure that substantially equal signals are applied to input terminals 32 and 36 of amplifier 34. This insures that there is no output signal from 34 which could be coupled back to input/output 54 where it originated.

Thus an input signal applied to terminal 54 is transmitted to terminal 30. It is effectively cancelled before the signal at 30 can propagate back to terminal 54 from where it originated.

The potentials Vi, Vk, Ve, Vm, Vo and Vp are selected to be of sufficient amplitude and polarity to cause LDDs 5, 6, 7 and 8 normally to operate in a reverse bias condition. Potentials Vj and Vn are selected to be of sufficient polarity and magnitude normally to permit forward conduction through LED3 and LED4. The power supplies which provide potentials Vi, Vj, Vo and Vp advantageously are electrically separate from the power supplies that supply potentials Vk, Vi, Vm and Vn.

It is thus apparent that an input signal applied to terminal 30 or 54 will be transmitted from one terminal to the other but will not return to the terminal at which the signal originates. Circuit 28 provides both physical and electrical isolation between terminals 30 and 54 and provides for the linear transfer of information between the respective terminals. The gain of amplifiers 38 and 44 can be varied by adjusting Zo1 and Zo2. Thus signals can be linearly transmitted between terminals 30 and 54 with gain introduced and relatively high electrical isolation. The output light signals of LED3 and LED4 can be coupled to LDD6 and LDD7, respectively, through optical fibers. The use of low-loss high-linearity optical fibers permits system 28 to be used as an optical transmission system.

Figure 4:
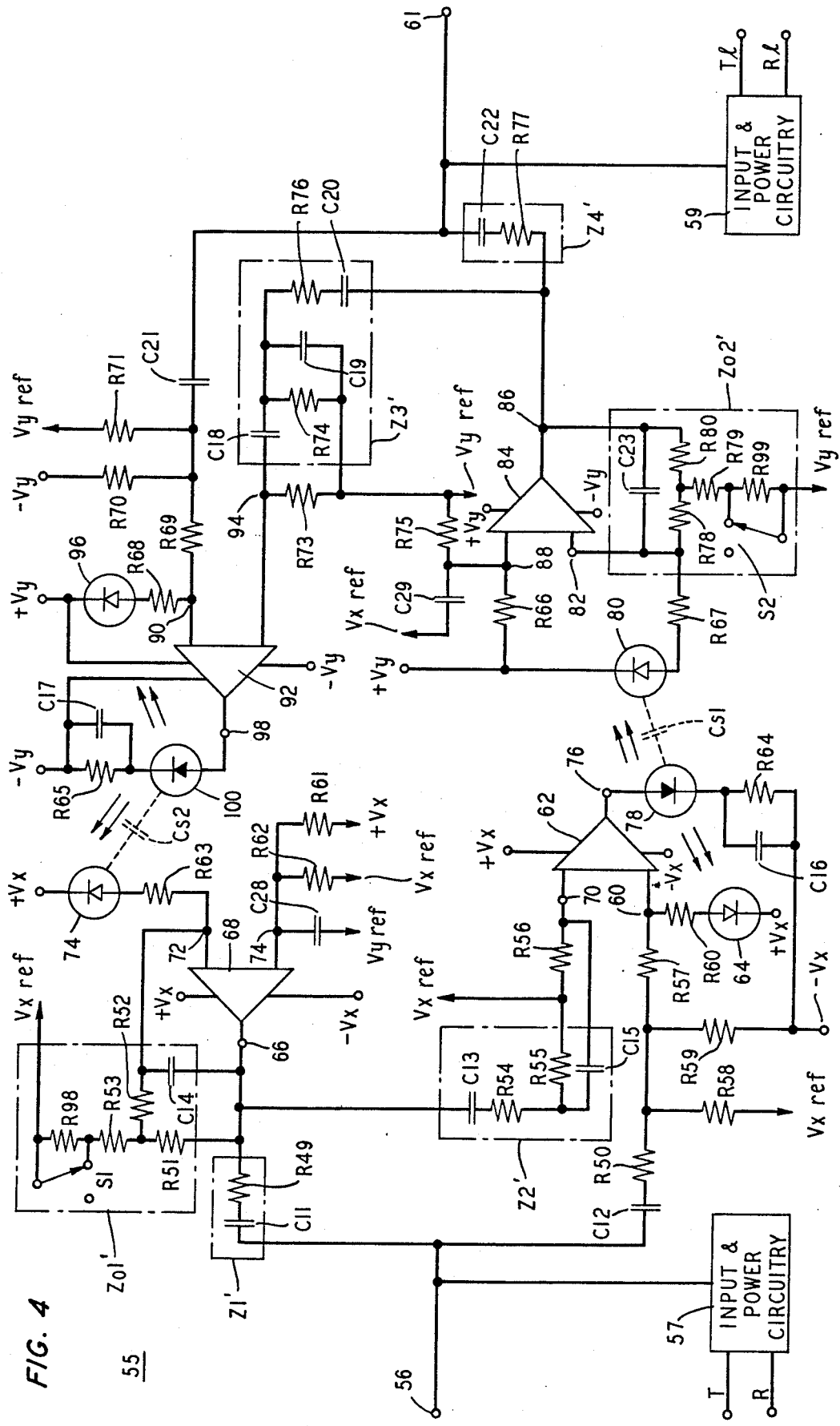
FIG. 4 illustrates another optically-coupled bilateral communication system.

Now referring to FIG. 4, there is illustrated an optically coupled two-wire to two-wire bilateral communication system 55. System 55 has been designed as a replacement for the transmission path with voice frequency gain that is illustrated by reference No 115 in FIG. 4 of U.S. Pat. No. 3,671,676 in which the assignee is the same as in this present application. The input terminals denoted as T and R of input and power circuitry 57 are connected through a central telephone office (not illustrated) to a first telephone set (not illustrated). The input terminals denoted as T1 and R1 are connected to a second telephone set (not illustrated) through the same critical telephone office (not illustrated). These two telephone sets are thus coupled together through system 55. The input and power supply circuitry 57 and 59, which are illustrated in block form, will be described later in detail.

The output of 57 is intermediate input/output terminal 56 and the output of 59 is intermediate input/output terminal 61. Terminal 56 is coupled through the series combination of a capacitor C12, a resistor R50, and a resistor R57 to an input terminal 60 of a differential two-input operational amplifier 62. Resistors R58 and R59 are connected to the common connection of R50 and R57. A resistor R60 is connected between terminal 60 and the anode of a light detecting diode 64. The cathode of 64 is coupled to a potential +Vx. R59 is connected to a potential −Vx. Output terminal 76 of amplifier 62 is connected to the anode of light emitting diode 78. The anode of 78 is coupled to a potential −Vx through the parallel combination of a resistor R64 and a capacitor C16. Terminal 56 is further connected through the series combination of a capacitor C11 and a resistor R49 to output terminal 66 of a two-point differential operational amplifier 68.

Terminal 66 is coupled to the series combination of a capacitor C13 and a resistor R54 to resistor R55 and a capacitor C15. C15 and a resistor R56 are both coupled to input terminal 70 of operational amplifier 62. R55 and R56 are both coupled to a source of potential Vx ref. Terminal 66 is also connected to the series combination of resistors R51, R53 and R98. R98 is coupled to a source of potential Vx ref and to a switch S1. S1 is a two-position switch which shorts R53 to Vx ref or connects R53 to Vx ref through R98. The common node of R53 and R51 is coupled through resistor R52 to capacitor C14 and to an input terminal 72 of operational amplifier 68. Terminal 72 is coupled through a resistor R63 to the anode of light detecting diode 74. C14 is also coupled to terminal 66. Resistor R61 is coupled to a resistor R62, and a capacitor C28 to input terminal 74 of operational amplifier 68. C28 is coupled to a source of potential Vy ref. R62 is coupled to Vx ref, and R61 is coupled to +Vx.

A light detecting diode 80 is coupled by the anode through a resistor R67 to an input terminal 82 to an operational amplifier 84. The cathode of 80 is coupled to a source of potential +Vy. A resistor R66 is coupled between +Vy and in input terminal 88 of amplifier 84. A capacitor C29 is coupled between Vx ref and terminal 88. A resistor R75 is coupled between Vy ref and terminal 88. Terminal 82 is connected through the series combination of resistors R78 and R80 to the output terminal 86 of operational amplifier 84. A capacitor C23 is connected between terminals 82 and 86. R78 and R80 are connected to the series combination of a resistor R79 and a resistor R99. R99 is coupled to a source of potential Vy ref and a twoposition switch S2. In one position S2 shorts R79 directly to Vy ref. In the other position R79 is coupled to Vy ref through R99.

Terminal 86 is connected through the series combination of resistor R77 and capacitor C22 to intermediate input/output terminal 61 and to an input terminal 90 of an operational amplifier 92 through the series combination of a capacitor C21 and a resistor R69. Terminal 86 is also connected to input terminal 94 of 92 through the series combination of a capacitor C20, a resistor R76, and a capacitor C18. A capacitor C19 and a resistor R74 are both connected between C18 and Vy ref. A resistor R73 is connected between terminal 94 and Vy ref. Resistors R70 and R71 are both connected to R69. R70 and R71 are connected to sources of potential -Vy and Vy ref, respectively. Terminal 90 is connected through resistor R68 to the anode of a light detecting diode 96. The cathode of 96 is coupled to +Vy. Output terminal 98 of amplifier 92 is coupled to the anode of a light emitting diode 100. The cathode of 100 is connected to a source of potential -Vy through the parallel combination of a resistor R65 and a capacitor C17.

The combination of C11 and R49 and C22 and R77 (contained within dashed line rectangles Z1' and Z4', respectively) act as line terminations. The combination of C13, C15, R54 and R55 (contained within dashed line rectangle X2') acts as a first hybrid subtraction or cancellation impedance. The combination of C18, C19, C20, R74 and R76 (contained within dashed line rectangle Z3') acts as a second hybrid subtraction or cancellation impedance.

The combination of C14, R51, R52, R53, R98 and S1 (contained within dashed line rectangle Zo1') serves as a gain control feedback impedance across input terminal 72 and output terminal 66 of operational amplifier 68. The combination of C23, R78, R79, R80, R99 and S1 (contained within dashed-line rectangle Zo2') serves as a gain control feedback impedance across input terminal 82 and output terminal 86 of operational amplifier 84.

C12 and C21 serve to block dc input signals from reaching input terminals 60 and 90 of operational amplifiers 62 and 92, respectively.

R50 serves to attenuate input signals coupled to terminal 56. R58 and R59 serves as a voltage divider network. R70 and R71 likewise serve as a voltage divider network. R57 and R69 serve as signal summing resistors.

Cs1 represents the inherent parasitic capacitance between light emitting diode 78 and light detector diode 80. Cs2 represents the inherent parasitic capacitance between light emitting diode 100 and light detecting diode 74. As has already been described, C28 is coupled between input terminal 74 of operational amplifier 68 and potential Vy ref. In addition, C29 is coupled between input terminal 88 of operational amplifier 84 and potential Vx ref. C28 and C29 serve to inject common mode signals into the respective first input terminals of the operational amplifiers 68 and 84 so as to cancel common mode signals injected into the second input terminals by the two parasitic capacitances Cs1 and Cs2. This effectively prevents common mode signals from propagating through the system 55.

LED78 is positioned with respect to LDD64 and LDD80 such that light emitted by LED 78 impinges on the photosensitive areas of LDD64 and LDD80. This incident light causes a photoinduced feedback current through LDD64 and an output signal current through LDD80.

LED100 is positioned with respect to LDD96 and LDD74 such that light emitted by LED100 impinges on the photosensitive areas of LDD96 and LDD74. This incident light causes a photoinduced feedback current through LDD96 and an output signal current through LDD74.

Potentials +Vx and +Vy are of such amplitude and polarity that LDD64, LDD80, LDD96 and LDD74 are normally operated in reverse bias. R60, R63, R67 and R68 are included to insure that if by mistake LDD64, LDD80, LDD96 or LDD74 are forward-biased, that the current flow is limited. Potentials -Vx and -Vy ae of such amplitude and polarity that LED78 and LED100 can be forward-biased and thus emit light. R56 and R73 serve to insure that input terminals 70 and 94 do not float in potential to limit the pickup of noise signals.

Potentials +Vx and −Vx are supplied to amplifiers 62 and 68. Potentials +Vy and −Vy are supplied to amplifiers 84 and 92.

The series combination of R66 and R75 set up a dc voltage level at terminal 88. The series combination of R61 and R62 set up a dc voltage level at terminal 74.

Undesirable common mode signals in the power supply which generates potential Vx ref are coupled to 88 through C29. Cs1 coupled these same common mode signals to terminal 82 through R67. The value of C29 is selected to equalize the undesirable common mode signals which reach 88 and 82. These equal input signals effectively cancel each other and the output signal of operational amplifier 84 is essentially free of these undesirable signals.

Undesirable common mode signals in the power supply which generates Vy ref are coupled to 74 through C28. Cs2 coupled these same common-mode signals to 72 through R63. The value of C28 is selected to equalize the undesirable common mode signals which reach 72 and 74. These equalized signals effectively cancel each other and the output signal of operational amplifier 64 is essentially free of these undesirable signals.

An input voice signal applied to the T and R input terminals of 57 propagates to terminal 56 and then to terminal 60 through C12, R50 and R57. The applied signal also propagates through the series combination of C11 and R49 to terminal 66 which acts as a virtual ground because it is the output terminal of operational amplifier 68. The impedance within Z1' is that impedance which a central telephone office line and telephone set is nominally terminated in. The input signal applied to T and R does not reach input terminal 70 because terminal 66 is a virtual ground.

The opto coupler made up of amplifier 62, LED78, LDD64 and LDD80 functions in essentially the same manner as the opto coupler made up of amplifier 24, LED2, LDD3 and LDD4 of FIG. 2. Thus an ac input signal applied to input terminal 60 is optically coupled to terminal 82 and the inherent nonlinearity of LED78 is effectively cancelled due to the optical feedback to LDD64.

The signal appearing at terminal 82 is amplified by amplifier 84 and is coupled from output terminal 46 to intermediate input/output terminal 61 through R77 and C22, and then is coupled through C21 and R69 to input terminal 90 of amplifier 92. In addition, the signal appearing at terminal 86 is coupled through the combination of C18, C19, C20 and R74 and R76 to input terminal 94 of amplifier 92. Z3' and Z4' are designed, taking into account the impedance characteristics of a transmission line and telephone set coupled to T1 and R1 such that substantially equal signals from terminal 86 are coupled to 90 and 94. Because equal input signals appear at the two inputs of 92, there is no output signal and the current level in LED100 does not change. Consequently, the input signal applied to 56 cannot propagate through LED100 to LDD74 and then through 68 back to 56 where it originated.

An input voice signal applied to the T1 and R1 terminals of 59 propagates to terminal 61 and then to terminal 90 though C21 and R69. The signal also propagates through the series combination of C22 and R77 to terminal 86 which acts as a virtual ground since it is the output terminal of operational amplifiers 84. Z4' is that impedance which a transmission line (subscriber loop) and telephone set is nominally terminated in. The input signal at 61 does not reach input terminal 94 since terminal 86 is a virtual ground.

The opto coupler made up of amplifier 92, LED100, LDD96 and LDD74 functions in essentially the same manner as the opto coupler made up of amplifier 62, LED78, LDD64 and LDD80. Thus an input signal applied to terminal 90 is optically coupled to terminal 72 and the inherent nonlinearity of LED100 is effectively cancelled due to the optical feedback through LDD96.

The signal appearing at terminal 72 is amplified by amplifier 68 and is coupled from output terminal 66 to terminal 56 through Z1' and then through C12 and R50 to input terminal 60 of amplifier 62. In addition, the signal at 66 is coupled through Z2' to input terminal 70 of amplifier 62. Z1' and Z2' are designed, taking into account the impedance characteristics of the transmission line (subscriber loop) and telephone set coupled to T and R, such that substantially equal signals from terminal 66 are coupled to 90 and 94. Because equal input signals appear at the two inputs of 62, there is no output signal change and the current level in LED78 does not change. Consequently, the input signal applied to 61 cannot propagate through LED78 and LDD80 and then through 84 back to 61 where it originated.

An LED can be coupled to an LDD through an optical fiber. This allows the LED to be separated from the LDD by substantial distances which reduces the parasitic capacitance between the LED and LDD. The use of low loss optical fibers (light guides) permits system 55 to be used as an optical transmission system.

R64 and C16 serve as a gain and frequency shaping feedback impedance with respect to amplifier 62. R65 and C17 serve the same basic function with respect to amplifier 92.

With S1 positioned to short out R98 the gain of signals being amplified by 68 is higher than when R78 is not shorted. With S2 positioned to short out R99 the gain of signals being amplified by 84 is higher then when R99 is not shorted. The length of a subscriber telephone loop determines which of the two positions S1 and S2 are set to.

Mispositioning of LEDs 78 and 100 with respect to LDD64 and 80 and LDD74 and 96 respectively, causes the amplitude of signals which reach 72 and 82, respectively, to vary. Differences in the physical characteristics of the LDDs can also lead to the same result. This in turn leads to variations in gain between terminals 56 and 61. Resistors R53 and R79 can be varied in value to compensate for gain variations due to any mispositioning.

It is thus apparent that system 55 is a bilateral communication system in that an input signal applied to T and R or T1 and R1 is transmitted with the desired gain from one input/output to the other, but does not return from where it originated. System 55 allows for the linear transfer of voice signal information with gain and provides relatively high electrical isolation between two sending/receiving units.

Figure 5:
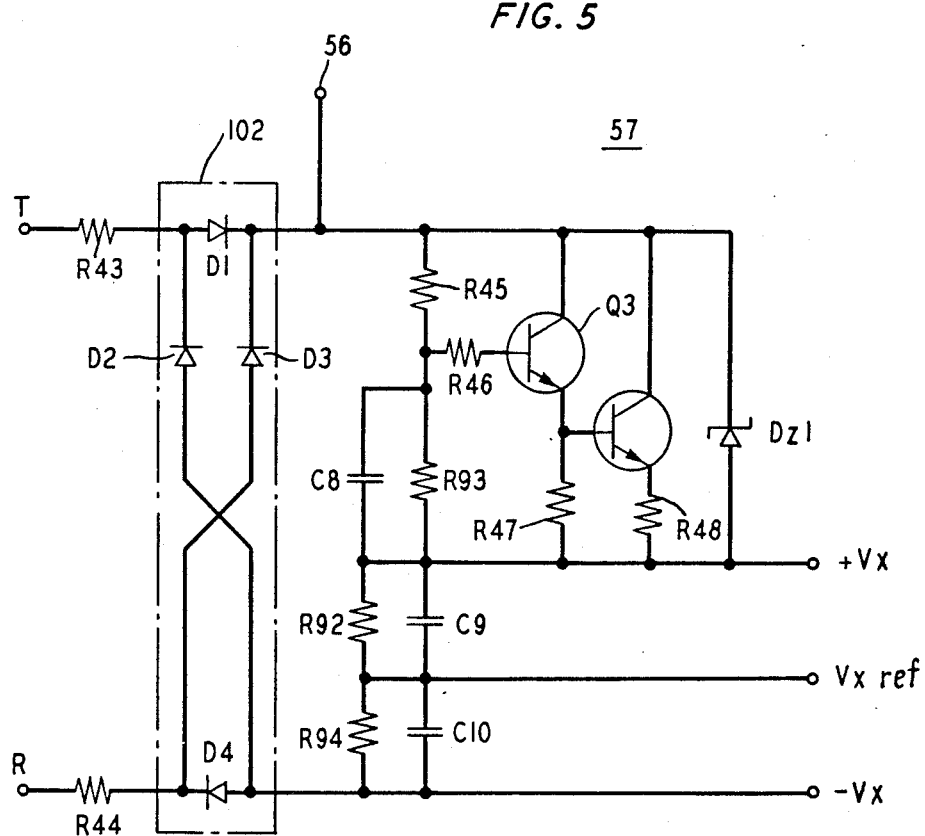
FIG. 5 illustrates a circuit embodiment of an input and power circuit of FIG. 4.

Referring now to FIG. 5 there is illustrated a circuit embodiment of the input and power circuitry 57 of FIG. 4. The T and R input terminals are coupled through battery feed inductor coils (not illustrated) to a potential Vz and a reference potential, which are both typically available in a central telephone office. Vz is typically +48 volts or −48 volts and the reference potential is typically ground potential. Input terminals T and R are connected through resistors R43 and R44, respectively, to a polarity guard which is shown within dashed line rectangle 102. The polarity guard consists essentially of diodes D1, D2, D3 and D4, which are interconnected as illustrated. The cathode of D1 is coupled to intermediate input/output terminal 56, one terminal of a resistor R45, the collector of a transistor Q3, the collector of a transistor Q4, and the cathode of a zener diode Dz1. The second terminal of R45 is coupled to the base of Q3 through a resistor R46 and is coupled to one terminal of a capacitor C8 and a resistor R93. The second terminals of C8 and R93 are connected to the first terminals of a resistor R92 and a capacitor C9. This common terminal is connected to the second terminals of resistors R47 and R48 and the anode of Dz1. This terminal supplies the potential +Vx.

The first terminal of R47 is connected to the emitter of Q3 and the base of Q4. The second terminals of R92 and C9 are connected together to the first terminal of a resistor R94 and a capacitor C10. This terminal supplies the Vx ref potential. The second terminals of R94 and C10 are coupled together to the anode of D4. This terminal supplies the potential -Vx.

One of the requirements of a central telephone office is that a specified essentially constant current flow between the T and R terminals when a telephone set coupled to the T and R terminals is off-hook. The dc current serves as the carrier for voice signals. Because the battery feed inductors have a certain finite dc resistance, it is necessary that the effective resistive loading between the cathode of D1 and the anode of D4 be equivalent to a value which results in the desired current flow through T and R. A simple resistor across these terminals would meet this particular electrical requirement.

The impedance of the telephone set and transmission line coupling it to the T and R input terminal is nominally 900 ohms in series with 2µF. A relatively low resistance coupled between terminal 56 and the anode of D4 would greatly attenuate any voice input or output signals.

The circuitry which comprises R45, R46, R47, R48, R92, R94, C8, C9, C10, Dz1 and Q3 and Q4 acts as an essentially high impedance constant current sink and ac filter combination. R43 and R44 are utilized in order to limit excessive power dissipation. Dz1 normally operates in reverse bias. Avalanche breakdown operation occurs only if the potential of 56 becomes excessive. The three potentials +Vx, +Vx ref, and -Vx are all dc potentials which are utilized by the bidirectional communication system 55 of FIG. 4.

Figure 6:
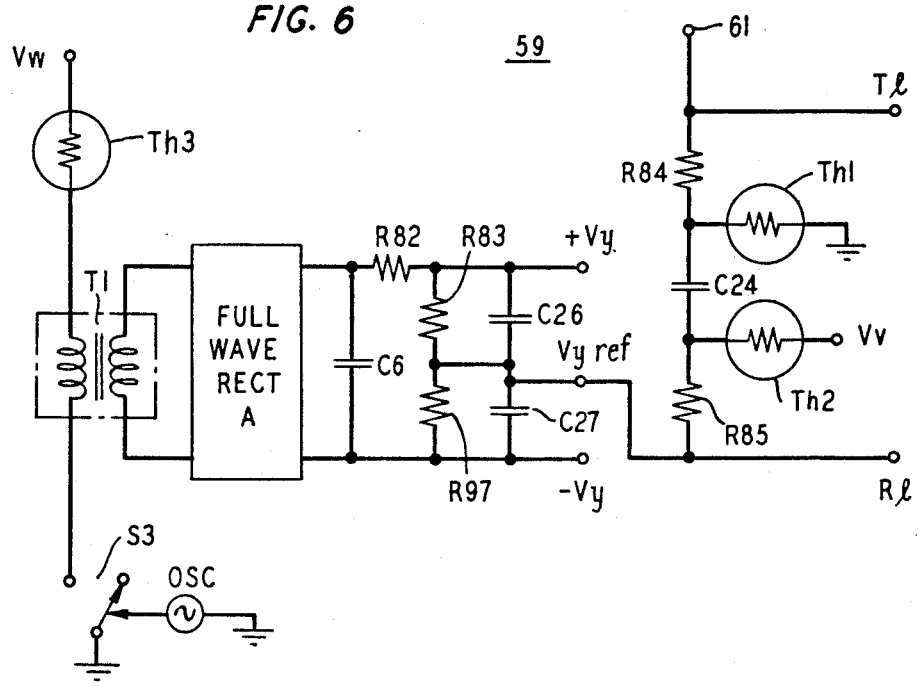
FIG. 6 illustrates a circuit embodiment of another input and power circuit of FIG. 4.

Now referring to FIG. 6 there is illustrated a circuit schematic embodiment of the input and power circuitry circuit 59 of FIG. 4. Input terminal T1 is connected to intermediate input/output terminal 61 and the first terminal of a resistor R84. The second terminal of R84 is coupled to the first terminal of a thermistor Th1 and the first terminal of a capacitor C24. The second terminal of Th1 is coupled to a reference potential which exists in the central telephone office. The second terminal of C24 is coupled to the first terminal of a second thermistor Th2 and to the first terminal of a resistor R85. The second terminal of Th2 is coupled to a potential Vv which exists in the central office. Vv is typically -78 volts and the reference potential is typically the ground potential of a central telephone office.

The second terminal of R85 is connected to input terminal R1 and to the second terminals of a capacitor C26 and a resistor R85, and to the first terminals of a resistor R97 and a capacitor C27. This terminal supplies the Vy ref potential which is utilized by system 55 of FIG. 4.

The second terminals of R97 and C27 are connected to the second terminal of a capacitor C6 and an output terminal of a full-wave rectifier A. This terminal supplies the −Vy potential which is utilized by the system 55 of FIG. 4. The first terminals of R83 and C26 are connected together to the second terminal of a resistor R82. This terminal supplies the +Vy potential utilized by the system 55 of FIG. 4. The first terminal of R82 is connected to an output of full-wave rectifier A.

The output terminals of a transformer T1 are coupled to the inputs of full-wave rectifier A. A first input terminal of T1 is connected through a thermistor Th3 to a potential Vw which is available in a central telephone office. The second input terminal of T1 is connected to a switch S3. An oscillator circuit Osc is coupled to and controls switch S3.

The oscillator circuit causes S3 to open and close such that an alternating current is established through the primary of T1. This gives rise to an alternating current in the secondary of T1. This alternating current is rectified by full-wave rectifier A and then filtered by C6 so as to create a dc voltage at the first terminal of R82. R83 and R97 are selected to be of substantially equal values such that the potential drop at their common junction is one-half the potential value applied across both resistors. C26 and C27 serve to filter the dc voltage appearing across R83 and R97.

An input voice signal from a telephone set coupled between T1 and R1 causes a voice signal to be transmitted to intermediate input/output terminal 61. Power supply Vv supplies dc bias current for the telephone set connected to input terminals Ta and R1. Capacitor C24 serves as an effective ac short. Voice input signals coupled to intermediate input/output terminal 61 effectively bypass the potential Vv.

The embodiment of the invention illustrated in FIGS. 4, 5 and 6 has been constructed and tested in a working telephone system. Western Electric 502AR dual input differential operational amplifiers were used for amplifiers 62, 68, 84 and 92. Below are listed values of resistors and capacitors utilized. All resistor values are in ohms and all capacitive values are in microfarads except as indicated:

R43 — 10; R52 — 147k
R44 — 10; R53 — 7.5k
R45 — 22k; R54 — 18k R46 — 1.78k; R55 — 3.9k
R47 — 21.5k; R56 — 100k
R48 — 147; R57 — 100k
R49 — 909; R58 — 17.8k
R50 — 27k; R59 — 147k
R51 — 56.2k; R60 — 10k
R61 — 21.5k; R76 — 10k
R62 — 348k; R77 — 464
R63 — 10k; R78 — 147k
R64 — 147; R79 — 5.62k
R65 — 147; R80 — 56.2k
R66 — 38.3k; R82 — 287
R67 — 10k; R83 — 133k
R68 — 10k; R84 — 215
R69 — 100k; R85 — 215
R70 — 237k; R92 — 511
R71 — 17.8k; R93 — 17.8k
R73 — 100k; R94 — 511
R74 — 8.2k; R97 — 133k
R75 — 4.64k; R99 — 1.62k
C6 — .1; C18 — .047
C8 — .22; C19 — .001
C9 — 40; C20 — .047
C10 — 40; C21 — .05
C11 — 2.0; C22 — 2.0
C12 — .011; C23 — 18pF
C13 — .022; C24 — 4
C14 — 18pF; C26 — 40
C15 — .022; C27 — 40
C16 — .015; C28 — 4.75pF
C17 — .015; C29 — 51pF

The LEDs used in system 55 were GaP diodes and the LDDs were silicon diodes.

With a standard −10dBm telephone voice signal applied to the T & R inputs, the measured full harmonic distortion level at the T1 and R1 outputs was 60 to 65dB down from the input signal level. The third harmonic distortion level was significantly smaller than the second.

Undesirable common mode signals, for example the "60-cycle hum" of ac power lines, are coupled through stray capacitances or inductances into the T & R or the T1 and R1 terminals. It is desirable that these stray signals not be coupled between T & R and T1 and R1. One test measure of a communication system is the rejection or attenuation of such undesirable common mode signals. With a 20dBm—3000Hz common mode input signal applied to input terminals T & R, the measured output signal appearing at T1 and R1 is 77dB down from the level of the input signal. When the input signal frequency is 100Hz, the corresponding output signal is 95dB down.

While the system of FIG. 4 has been specifically designed for use within the telephone voice frequency range, it is relatively easy to redesign component values for other frequency ranges including dc operation signal.

The embodiments described herein are intended to be illustrative of the general embodiments of the invention. Various modifications are possible consistent with the spirit of the invention. For example, a three-transistor-type Darlington amplifier can be substituted for the Darlington pair amplifier or the operational amplifier. In a system which uses the triple Darlington pair amplifier, the cancellation impedances are coupled between the outputs of the emitters of the triple Darlington which replace amplifiers 68 and 84 and the input base terminals of the triple Darlington which replace amplifiers 62 and 92, respectively. A resistor is coupled between a potential and the collectors of the three transistors of the triple Darlington amplifiers which replace amplifiers 68 and 84. The collectors of the triple Darlingtons which replace 68 and 84 are coupled to terminals 56 and 61, respectively, through appropriate line termination impedances. Still further, LED1 of FIG. 1 could be coupled in series with the collector of Q2 instead of the emitter. Still further, p-n-p transistors can be substituted for the n-p-n transistors providing power supply potentials and magnitudes are appropriately changed and diodes are reversed where appropriate. Still further, MOS transistors or JFETs (junction field effect transistors) could be substituted for the n-p-n transistors.

Figure 7:
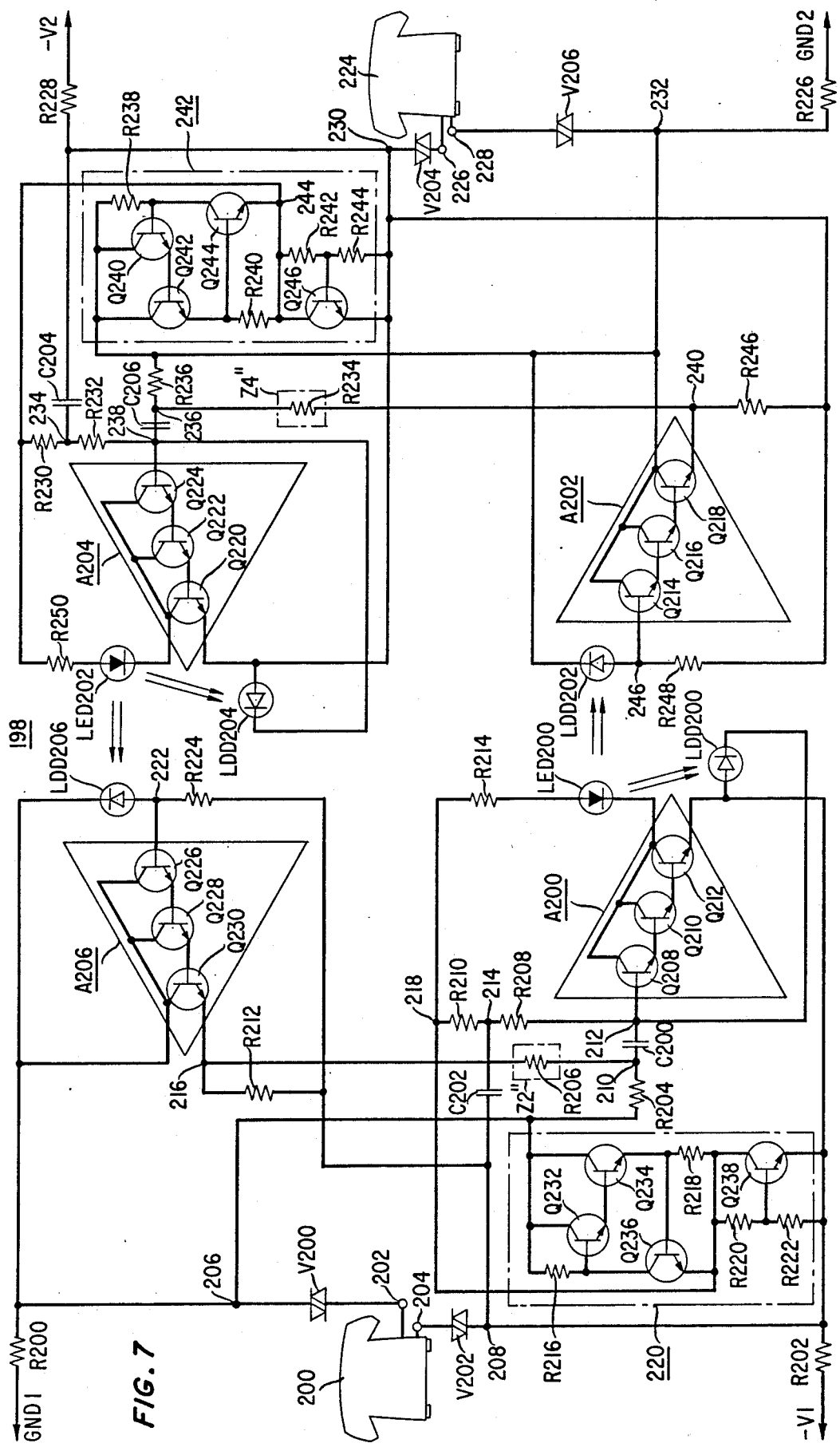
FIG. 7 illustrates another optically-coupled bilateral communication system.

Now referring to FIG. 7 there is illustrated an embodiment of an optically coupled bidirectional communication system 198 which utilizes Darlington-type circuit amplifiers as described above. System 198 comprises two light emitting diodes LED200 and LED202, four light detecting diodes LDD200, LDD202, LDD204 and LDD206, and four amplifiers A200, A202, A204 and A206.

Each of the aforesaid amplifiers comprises three n-p-n junction transistors in which the collectors are all coupled together and the emitter of each first transistor is coupled together and the emitter of each first transistor is coupled to the base of each second transistor and the emitter of each second transistor and the emitter of each second transistor is coupled to the base of each third transistor. The three transistors of A200 are Q208, Q210 and Q212. The three transistors of A202 are Q214, Q216 and Q218. The three transistors of A204 are Q220, Q222 and Q224. The transistors of A206 are Q226, Q228 and Q230. The three transistors of each of the aforesaid amplifiers are connected together in what is commonly denoted as a Darlington-type configuration.

One or two of the three transistors of each of the aforedescribed amplifiers could be eliminated, still leaving functional amplifiers.

A telephone handset 200 is coupled between terminals 202 and 204, which are respectively coupled through varistors V200 and V202 to terminals 206 and 208. Terminal 206 is coupled through a resistor R200 to a first ground potential denoted as GND 1. Terminal 208 is coupled through a resistor R202 to a voltage source denoted as −V1.

Terminal 206 is coupled through a resistor R204 to a terminal 210. Terminal 210 is coupled to a resistor R206 (illustrated within dashed line rectangle denoted as cancellation impedance Z2″) and to a capacitor C200. R206 is coupled to a terminal 216 and to the emitter of Q230. C200 is coupled to terminal 212, to the base of Q208 (the input of A200), the cathode of LDD200, and to one terminal of a resistor R208. The second terminal of R208 (terminal 214) is coupled to a resistor R210 and to a capacitor C202. Capacitor C202 is coupled to terminal 208 and through a resistor R212 to terminal 216 (the emitter of Q230). R210 is coupled to terminal 218 and to a resistor R214 that is coupled to the anode of LED200. The cathode of LED200 is coupled to the collectors of Q208, Q210 and Q212. The emitter of Q212 is coupled to the anode of LDD202 and to terminal 208.

The circuitry contained within dashed line rectangle 220 comprises transistors Q232, Q234, Q236 and Q238 and resistors R216, R218, R220 and R222. The function of the circuitry within dashed line rectangle 220 is to provide a terminal 218, which is coupled to the emitter of Q236, a relatively constant dc voltage source. Terminal 206 is coupled to one terminal of R216 and to the collectors of Q232 and Q234. The second terminal of R216 is coupled to the base of Q232 and the collector of Q236. The emitter of Q232 is coupled to the base of Q234 and the emitter of Q234 is coupled to the base of Q236 and one terminal of R218. The emitter of Q236 is coupled to terminal 218, a second terminal of R218, a first terminal of R220 and the collector of Q238. The second terminal of R220 is coupled to the base of Q238 and a first terminal of R222. The second terminal of R222 and the emitter of Q238 are coupled to terminal 208.

The collectors of Q226, Q228 and Q230 are all coupled to the cathode of LDD206 and to terminal 206. The anode of LDD206 is coupled to the base of Q226, (the input of A206) terminal 222 and R224. R224 is also coupled to the second terminal of R212 and terminal 208.

LED200 is positioned with respect to LDD200 and LDD202 such that light emitted by LED200 impinges on the phototsensitive areas of LDD200 and LDD202. LED202 is positioned with respect to LDD204 and LDD206 such that light emitted by LED202 impinges on the photosensitive areas of LDD204 and LDD206.

A second telephone receiver-sender unit 224 is coupled between terminals 226 and 228, which are respectively coupled to terminals 230 and 232 through varistors V204 and V206, respectively. Terminal 230 is coupled through a resistor R228 to a voltage source denoted as −V2. Terminal 232 is coupled through a resistor R226 to a ground potential denoted as GND 2. GND 2 is electrically separate from GND 1 and −V1 is electrically separate from −V2. Terminal 230 is coupled through a capacitor C204 to terminal 234, and resistors R230 and R232. R232 is coupled to terminal 238, a capacitor C206, the base of Q224 (the input of A204) and the cathode of LDD204. C206 is coupled to terminal 236, resistor R234 (illustrated within a dashed line rectangle denoted as cancellation impedance Z4″) and resistor R236. While Z2″ and Z4″ are illustrated as just resistors, it is to be appreciated that an R-C series or parallel combination or other variations can be substituted to obtain relatively wide band cancellation. R235 is coupled to terminal 240, the emitter of Q218, and a resistor R246. R236 is coupled to terminal 232.

The circuitry with dashed line rectangle 242 comprises transistors Q240, Q242, Q244, Q246 and resistors R238, R240, R242 and R244. The collectors of Q240 and Q242 and one terminal of R238 are all coupled together to terminal 232. The second terminal of R238 is coupled to the base of the Q240 and the collector of Q244. The emitter of Q242 is coupled to the base of Q244 and one terminal of R240. R240 is coupled to terminal 244, the emitter of Q244, the collector of Q246 and one terminal of R242. The second terminal of R242 is coupled to the base of Q246 and one terminal of R244. The emitter of Q246 is coupled to the second terminal of R244, the anode of LDD204, the emitter of Q220, and to terminal 230. Terminal 244 is coupled to R230 and a resistor R250. R250 is coupled to the anode of LED202. The cathode of LED202 is coupled to the collectors of Q220, Q212 and Q224.

The anode of LDD202 is coupled to terminal 246, the base of Q214 (the input of Q214) and R248. The cathode of LED202 is coupled to terminal 232 and the collectors of Q214, Q216 and Q218. Second terminals of R246 and R248 are coupled to terminal 230.

As the receiver-sender of telephone 200 is lifted off-hook and a voice signal is impressed thereupon, the signal propagates through V200 and then through R204 and C200 to the base of Q208 (the input of A200). This signal is superimposed over the dc bias supplied through R200.

The circuitry contained within dashed line rectangles 220 and 242 serves to provide an essentially constant voltage source at terminals 218 and 244, respectively. Any fluctuations in potential which might appear at 218 and 244 are further attenuated by C202 and C204, respectively.

The input signal which reaches the base of Q208 is amplified by A200 and gives rise to a corresponding output current through LED200. LED200 emits light as a function of the current level therethrough. This light impinges upon LDD200 and LDD202. The light signal reaching LDD200 serves as a feedback signal and the light signal reaching LDD202 serves as the output signal. The current induced through LDD202 gives rise to current through R248. This causes a voltage varying signal to be developed at the base of Q214 (the input to A202) that is proportional to the voice input signal at 200. An output signal from A202 appears at terminal 232. This signal if coupled through V206 to telephone receiver-sender 224. Thus a voice signal introduced into 200 is transmitted to telephone receiver-sender 224. The output signal at 232 is also coupled through R236 to terminal 236. The signal appearing at the emitter of Q218 (terminal 240) of A202 is 180 degrees out of phase from the output signal appearing at terminal 232 (the collectors of Q214, Q216 and Q218). The telephone 224 and its connecting line has an inherent impedance characteristic associated therewith. Z4″ is designed taking into this impedance to insure that signals of substantially equal magnitude are coupled to terminal 236. The signal appearing at terminal 240 is coupled through R234 (cancellation impedance Z4″) to terminal 236. The two signals appearing at terminal 236 are 180 degrees out of phase and substantially equal in magnitude. They therefore cancel each other and there is no input signal coupled to the base of Q224 (the input of A204) as a result of the input signal originating at 200.

There is accordingly, no signal sent from LED202 to LDD206 as a result of the voice signal appearing at 200. Thus an input signal from telephone 200 is coupled to telephone 224 but is not permitted to return to telephone 200 where it originated.

As the telephone sender-receiver 224 is lifted off-hook and a voice signal is introduced, A204 is activated in essentially the same way as A200 was activated when a voice signal was introduced into telephone sender-receiver 200. The voice signal is amplified by A204 and optically coupled from LED202 to LDD204 and LDD206. The resulting signal at the base of Q226 is amplified by A206 and coupled from the collector of Q230 through V200 to telephone receiver-sender 200. This output signal from A206 also feeds back through R204 to terminal 210. The output signal appearing at the emitter of Q230, which is 180 degrees out of phase with the signal appearing at the collector of Q230, is fed back through R206 (cancellation impedance Z2″) to terminal 210. The telephone 220 and its connecting line has an inherent impedance characteristic associated therewith. Z2" is designed taking into account this impedance to insure that substantially equal signals are coupled to 210. The two signals from A206 reaching terminal 210, are substantially equal in magnitude and 180° out of phase. They therefore cancel each other and thus a signal from 224 reaches 200 but is not coupled back to where it originated. Thus, a voice input signal applied at 200 is transmitted to 244 but is allowed to return to 200.

It is thus apparent that an input voice signal at 200 or 226 will be transmitted from one telephone to the other but will not return to the telephone from which the signal originated. System 198 provides both physical and electrical isolation between 200 and 226 and provides for the linear transfer of information between the respective telephones. Optical fibers can be utilized to couple the LEDs and the LDDs if desird. The use of low-loss optical fibers, particularly between LED200 and LDD202 and LED202 and LDD206, permits system 198 to be used as an optical transmission system.

A bidirectional communication system essentially identical to system 198 of FIG. 7, except that the amplifiers corresponding to amplifiers A200, A202, A204, and A206 comprise only two transistor Darlington's, has been constructed, tested, and found to be functional.

The bidirectional communication systems of FIGS. 4 and 7 are generally denoted as two-wire to two-wire systems (essentially one input/output terminal and one ground terminal associated with each opto-coupler and output amplifier). A well known variation of this two-wire to two-wire system in a two-wire to four-wide system in which there is one input/output terminal, a separate input terminal, and a separate output terminal. Only one cancellation impedance is needed in a two-wire to four-wire system since there is only one input/output terminal.

Figure 8:
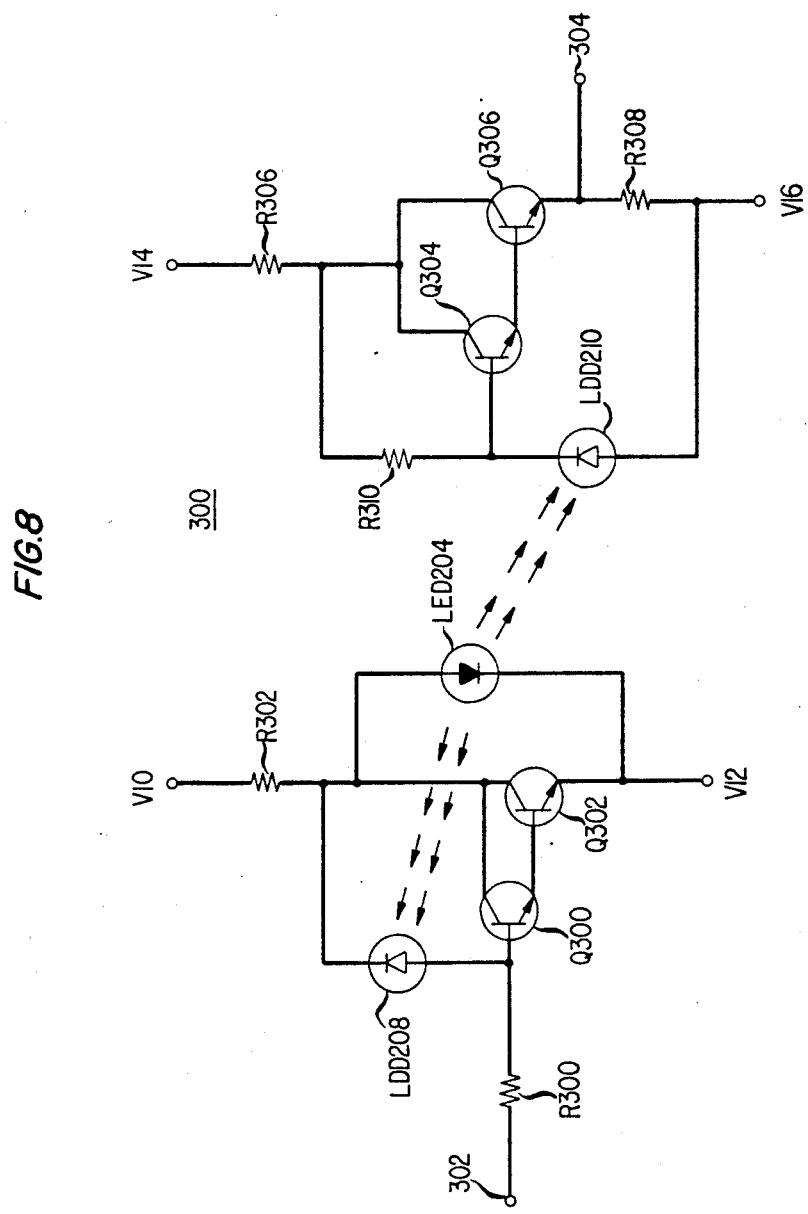
FIG. 8 illustrates another embodiment of an optocoupler circuit.

Now referring to FIG. 8 there is illustrated an opto-coupler circuit 300 which comprises an LED Shunt driver which comprises a Darlington pair of n-p-n junction transistors Q300 and Q302, a light emitting diode LED204, a light detecting diode LDD208, and resistors R300 and R302. Opto-coupler 300 also comprises a light detector circuit which comprises a light detecting diode LDD210, a Darlington pair of transistors Q304 and Q306, and resistors R306, R308, and R310.

An input terminal 302 is connected to a first terminal of R300. A second terminal of R300 is connected to the anode of LDD208 and the base of Q300. The cathode of LDD208 is connected to the collectors of Q300 and Q302, one terminal of R302, and the anode of LED204. The cathode of LED204 is connected to the emitter of Q302 and to a power supply denoted as V12. The emitter of Q300 is connected to the base of Q302. A second terminal of R302 is connected to a power supply denoted as V10.

The cathode of LDD210 is connected to the base of Q304 and one terminal of R310. The anode of LDD210 is connected to a first terminal of R308 and to a power supply denoted as V16. A second terminal of R310 is connected to the collectors of Q304 and Q306 and to a first terminal of R306. A second terminal of R306 is connected to a power supply V14. R306 can in an alternate embodiment of this light detector circuit be eliminated and thus the second terminal of R310 and the collectors of Q304 and Q306 are all connected to V14. The emitter of Q304 is connected to the base of Q306 and the emitter of Q306 is connected to an output terminal 304 and to a second terminal of R308. V10 and V12 are electrically isolated from V14 and V16. Potential supplies V14 and V16 are selected such that LDD210 is essentially always operated in reverse bias.

LED204 is positioned with respect to LDD208 and LDD210 such that light emitted by LED204 impinges on the photosensitive areas of LDD208 and LDD210.

The combination of V10 and R302 act as an essentially constant current source. Essentially only two electrical paths exist between V10 and V12. The first is through the collectors of Q300 and Q302 and the second is through LED204. Another path does exist through LED208, however, LED208 is maintained in a reverse bias condition and the leakage current therethrough is relatively small. Current is induced to flow through LED208 in the reverse direction when light is incident thereon.

An electrical input signal applied to input terminal 302 is amplified by Q300 and Q302 and results in a corresponding current being drawn through the collectors thereof. As the electrical signal applied to input terminal 302 increases, the current through Q300 and Q302 increases and the current flowing through LED204 decreases. This reduces the amount of light output emitted by LED204 and correspondingly reduces the feedback photocurrent induced through LDD208. This facilitates a greater current flow through Q300 and Q302 because less of the input current flowing through R300 is cancelled at the base of Q300. More current flows through Q300 and Q302 because there is less feedback light signal. Correspondingly, less current flows through LED204 and the light output is lowered. Thus the output light signal emitted by LED204 is the inverse of the electrical signal applied to input terminal 302.

The light from LED204 impinges on LDD210 and causes a photoinduced current therethrough in the reverse direction which gives rise to a voltage at the base of Q304. This voltage signal is the inverse of the electrical input signal applied to 302. With no light incident upon LDD210 the potential of the base of Q304 is close to that of V14 and current flows through Q304 and Q306 because the respective emitter-base junctions thereof are forward biased. Light received by LDD210 from LED204 induces current flow through LDD210 in the reverse direction. The current flows from V14 and thus reduces the magnitude of the potential at the base of Q304. This reduces the forward bias of the emitter-base junctions of Q304 and Q306 and thus reduces the current flow therethrough. The output voltage appearing at 304 is therefore also reduced. Thus, as the amount of light incident upon LDD210 increases the output voltage at 304 decreases. The light signal incident upon LDD210 is the inverse of the electrical signal at output terminal 304. The double inversion (i.e., the first inversion from 302 to LDD210 and the second inversion from LDD210 to 304) results in an electrical output signal appearing at 304 which is essentially the same as the electrical signal appearing at 302. Opto-coupler 300 thus provides physical and electrical isolation between input terminal 302 and output terminal 304.

A two-wire to two-wire or two-wire to four-wire bidirectional communication system can be implemented using two sets of opto-coupler circuits 300 and appropriate summing and cancellation impedances.

What is claimed is:

1. A bidirectional communication system comprising:
   first and second amplifier circuit means each having two input terminals and an output terminal;

third and fourth amplifier circuit means each having at least one input terminal and an output terminal;

first and second light emitting diodes (LEDs), the first and second LEDs being coupled to the output terminals of the first and second amplifiers, respectively;

first, second, third and fourth light detecting diodes (LDDs), the first and third LDDs being coupled to the first input terminal of the first and second amplifiers, respectively;

the first LED being positioned with respect to the first and second LDDs such that light emitted by the first LED impinges on the first and second LDDs;

the second LED being positioned with respect to the third and fourth LDDs such that light emitted by the second LED impinges on the third and fourth LDDs;

the second and fourth LDDs being coupled to the input terminals of the third and fourth amplifiers, respectively;

a first input/output terminal being coupled to the first input terminal of the first amplifier through a first summing impedance and to the output of the fourth amplifier through a first line matching impedance;

a second input/output terminal being coupled to the first input of the second amplifier through a second summing impedance means and to the output of the third amplifier through a second line matching impedance means;

the output terminal of the fourth amplifier being coupled to the second input terminal of the first amplifier through a first cancelling impedance means; and the output terminal of the third amplifier being coupled to the second input terminal of the second amplifier through a second cancelling impedance means.

2. The apparatus of claim 1 wherein:
the third and fourth amplifier circuit means each have a second input terminal;
a first parasitic capacitance couples the first LED to the second LDD; and
a second parasitic capacitance couples the second LED to the fourth LDD.

3. The apparatus of claim 2 further comprising:
a first capacitance coupled between the first amplifier circuit means and the second input of the third amplifier circuit means; and
a second capacitance coupled between the second amplifier circuit means and the second input terminal of the fourth amplifier circuit means.

4. An optically coupled bidirectional communication system comprising:
a first amplifier circuit means having an output and at least one input;
a first light emitting means coupled to the output of the first amplifier circuit means;
first and second light detecting means, the first and second light detecting means being positioned so as to receive light from the first light emitting means;
the first and second light detecting means being characterized in that the current induced therethrough is proportional to the light incident thereon and the ratio of the induced currents is essentially constant;
the first light detecting means being coupled to an input of the first amplifier circuit means;

second amplifier circuit means having an output and at least one input;
the second light detecting means being coupled to an input of the second amplifier circuit means;
third amplifier circuit means having an output and at least one input;
a second light emitting means coupled to the output of the third amplifier circuit means;
third and fourth light detecting means, the third and fourth light detecting means being positioned so as to receive light from the second light-emitting means;
the third and fourth light detecting means being characterized in that the current induced therethrough is proportional to the light incident thereon and the ratio of the induced currents is essentially constant;
the third light detecting means being coupled to an input of the third amplifier circuit means;
fourth amplifier circuit means having an output and at least one input;
the fourth light detecting means being coupled to the input of the fourth amplifier circuit means;
a first summing impedance and a first cancellation impedance;
a first input/output terminal being coupled to an input of the third amplifier circuit means through the summing impedance and being coupled to the output of the second amplifier circuit means; and
the first cancellation impedance being coupled to the output of the second amplifier circuit means and to an input of the third amplifier circuit means.

5. The apparatus of claim 4 wherein;
the third amplifier circuit means comprises two inputs and is characterized in that when signals of equal magnitude and the same polarity appear at the two inputs they cancel each other and there is essentially no output signal from the third amplifier means.

6. The apparatus of claim 5 further comprising:
a second input/output terminal, a second summing impedance, and a second cancellation impedance means;
the first circuit amplifier means comprises two inputs and is characterized in that when signals of equal magnitude and the same polarity appear at the two inputs they cancel each other and there is no output signal from the first circuit amplifier means;
the second input/output terminal being coupled to the second input of the first amplifier circuit means through the second summing impedance means and being coupled to the output of the fourth amplifier circuit means; and
the second cancellation impedance means being coupled to the first input of the first amplifier circuit means and to the output of the fourth amplifier circuit means.

7. An opto-coupler comprising:
a first amplifier having an output terminal, at least one input terminal, and a reference terminal;
a light emitting means coupled to the output terminal of the amplifier;
first and second light detecting means, the first and second light detecting means being positioned so as to receive light from the light emitting means;
the first and second light detecting means being characterized in that thhe current induced therethrough is proportional to the light incident thereon;

the first light detecting means being coupled to the input terminal of the first amplifier;

a second amplifier having at least two input terminals and one output terminal and being characterized in that when signals of equal magnitude and the same polarity appear at the two input terminals they cancel each other and there is essentially no output signal;

the signal light detecting means being coupled to the first of the two input terminals of the second amplifier; and capacitive coupling means having a first terminal coupled to the second input terminal of the second amplifier and having a second terminal coupled to the reference terminal of the first amplifier.

8. An optically coupled bidirectional communication system comprising:

a first amplifier having an output and one input;

a first light emitting diode coupled to the output of the first amplifier;

first and second light detecting diodes, the first and second light detecting diodes being positioned so as to receive light emitted by the first light emitting diode;

the first light detecting diode being coupled to the input of the first amplifier;

a second amplifier having an output and one input;

the second light detecting diode being coupled to the input of the second amplifier;

a third amplifier having an output and one input;

a second light emitting diode coupled to the output of the third amplifier;

third and fourth light detecting diodes, the third and fourth light detecting diodes being positioned so as to receive light emitted by the second light emitting diode;

the third light detecting diode being coupled to the input of the third amplifier;

a fourth amplifier having an output and one input;

the fourth light detecting diode being coupled to the input of the fourth amplifier;

a first summing impedance and a first cancellation impedance;

a first input/output terminal being coupled to the input of the third amplifier through the summing impedance and being coupled to the output of the second amplifier; and the first cancellation impedance being coupled to an output of the second amplifier and to the input of the third amplifier.

9. The apparatus of claim 8 wherein the first through fourth amplifier each comprise at least two junction transistors connected as a Darlington pair, the base of the first transistor of each Darlington pair serves as the input of the amplifier and the collectors of both transistors of the Darlington pair serve as the output of the amplifier.

10. The apparatus of claim 9 wherein the first light emitting diode is coupled between the collector and emitter of the second transistor of the Darlington pair which comprises the first amplifier and the second light emitting diode is coupled between the collector and emitter of the second transistor of the Darlington pair which comprises the third amplifier.

11. The apparatus of claim 9 wherein the first light emitting diode is coupled in series with the collector-emitter of the second transistor of the Darlington pair which comprises the first amplifier and the second light emitting diode is coupled in series with the collector-emitter of the second transistor of the Darlington pair which comprises the third amplifier.

* * * * *

UNITED STATES PATENT AND TRADEMARK OFFICE
CERTIFICATE OF CORRECTION

PATENT NO. : 4,056,719

DATED : November 1, 1977

INVENTOR(S) : Sigurd G. Waaben

It is certified that error appears in the above-identified patent and that said Letters Patent are hereby corrected as shown below:

In the drawings, Sheet 2, FIG. 3, the reference numeral for terminal "52" should read --51--. Column 1, line 12, "communicationssys-" should read --communications sys- --; line 25, "LED-LEDD" should read --LED-LDD--. Column 2, line 45, "abovede-" should read --above-de- --; line 63, "input-" should read --input/--; line 64, at the beginning of the line cancel "/"; line 68, "drawins:" should read --drawings:--. Column 3, line 5, "optocou-" should read --opto-cou- --; line 17, "optocou-" should read --opto-cou- --; line 55, "chance" should read --change--; line 67, "neces-" should read --unneces- --. Column 4, line 27, "cathode" should read --cathodes of--; line 29, after "anode" insert --of--. Column 5, line 16, "input-" should read --input/--; line 17, at the beginning of the line cancel "/"; line 43, "52" should read --51--; line 44, "52" should read --51--. Column 6, line 3, "termnal" should read --terminal--; line 4, cancel the hyphen at the end of the line; line 9, "couple" should read --coupled--; line 40, "characteristics" should read --characteristic--; line 60, "Vi" should read --V1--. Column 7, line 10, "comm-" should read --com- --; line 21, "critical" should read --central--; line 42, "two-point" should read --two-input--; line 64, "to" (second occurrence) should read --of--. Column 8, line 8, "twoposition" should read --two-position--; line 52, "serves" should read --serve--. Column 9, line 20, "ae" should read --are--; line 33, "coupled" should read --couples--; line 42, "coupled" should read --couples--. Column 12, line 57, "Ta" should read --T1--.

UNITED STATES PATENT AND TRADEMARK OFFICE
CERTIFICATE OF CORRECTION

PATENT NO. : 4,056,719

DATED : November 1, 1977

INVENTOR(S) : Sigurd G. Waaben

It is certified that error appears in the above-identified patent and that said Letters Patent are hereby corrected as shown below:

Column 15, line 49, "R235" should read --R234--. Column 17, line 35, "input-" should read --input/--; line 36, at the beginning of the line cancel "/". Column 20, line 67, "thhe" should read --the--. Column 21, line 9, "signal" should read --second--. Column 22, line 16, "amplifier" should read --amplifiers--.

Signed and Sealed this

Twenty-third Day of September 1980

[SEAL]

Attest:

SIDNEY A. DIAMOND

Attesting Officer

Commissioner of Patents and Trademarks